May 21, 1935. B. BOUDA 2,001,813
MECHANISM AND METHOD FOR SCALDING FOWLS
Filed Aug. 20, 1932
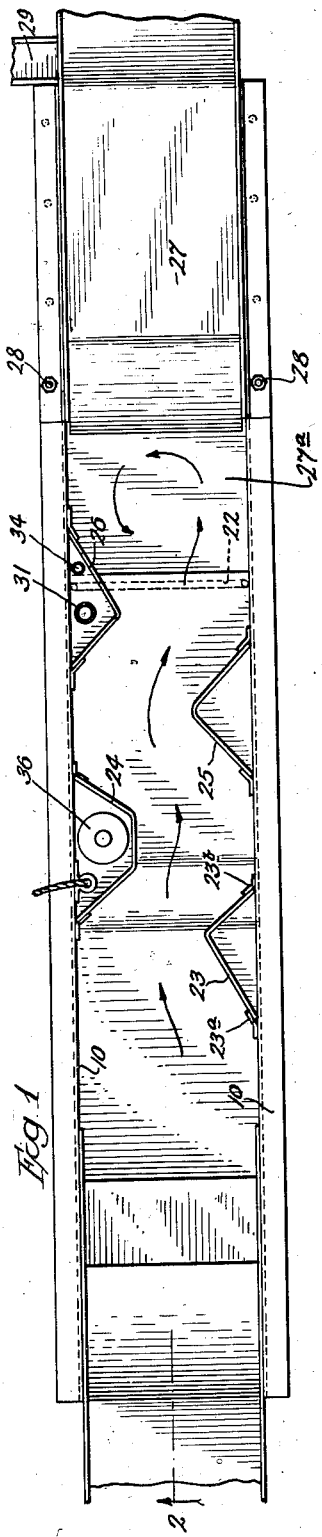
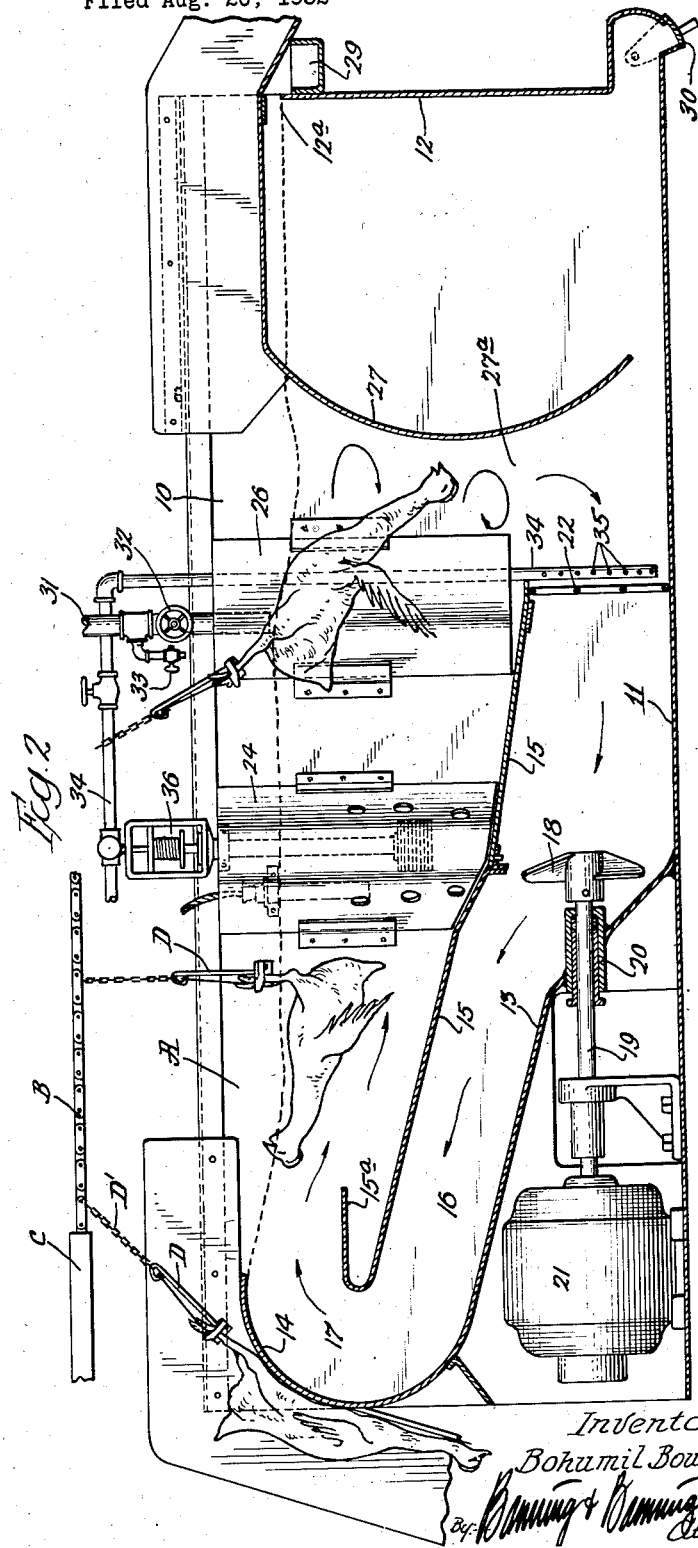
Inventor:
Bohumil Bouda Patented May 21, 1935

2,001,813

UNITED STATES PATENT OFFICE 2,001,813

MECHANISM AND METHOD FOR SCALDING FOWLS

Bohumil Bouda, Clinton, Iowa, assignor to The Collis Company, Clinton, Iowa, a corporation of Iowa Application August 20, 1932, Serial No. 629,656

8 Claims. (Cl. 17—11).

A primary object of this invention is to provide an improved method of and mechanism for scalding fowls so as to cause their feathers to be easily removed.

This and other objects, as will hereinafter appear, may be accomplished by this invention which is fully described in the following specification and shown in the accompanying drawing, in which—

Figure 1 is a top plan view of a scalding tank embodying the invention; and

Fig. 2 is a longitudinal vertical section through the same on the line 2 of Fig. 1.

The embodiment illustrated comprises a scalding tank A, over the center of which is slowly driven by any suitable means (not shown) a chain conveyor or the like B, which is carried in suitable guides C suspended in any well known manner. At intervals, shackles D are suspended from the conveyor by means of chains D' or the like, which are swivelly mounted on the conveyor so as to permit the shackles to rotate free for a purpose which will hereinafter be explained. Each shackle is adapted to grip a fowl by its feet whereby to suspend and advance the same lengthwise of the tank wherein the scalding operation takes place.

The scalding tank A is composed generally of substantially parallel sides of sheet metal 10, a bottom 11 and end wall 12 at the delivery end, and a sloping wall 13 at the forward or receiving end, the latter having a curved upper portion 14, and the whole secured together in any suitable manner as by welding so as to be water-tight. Above the sloping wall 13, and spaced therefrom, is a partition member 15 so as to provide a passage 16 which may be made either rectangular or circular in cross section, as desired. This passage 16 has near the top a return bend 17 and near the bottom is provided with a screw propeller 18 which is carried on a shaft 19 suitably journaled in a water-tight stuffing box 20 and driven by any suitable source of power, such as a motor 21. The shaft 19 may be equipped with a suitable thrust collar or bearing (not shown).

As the screw propeller 18 is rapidly rotated, water will be drawn in at the power right-hand end of the passage 16, and will flow up through the bend 17 and out past the plate 15a slightly downwardly, after which it will pass to the right through the tank and will eventually return through a grating 22, which is used to prevent any fowl which might become loosened from its shackle being drawn into the propeller. Along the sides of the upper passage is placed a series of staggered baffles 23, 24, 25 and 26 which are so located as to cause the water as it travels between these baffles to be churned into a series of eddy currents for bringing about a thorough wetting of the fowls. These baffles are preferably made for ready removal, and for this purpose the tank is provided with cleats 23a and 23b, behind which each baffle may be slid.

A delivery apron 27 is provided at the delivery end of the tank and is adjustably secured thereon by means of bolts 28 which may be placed in selected holes as the apron is moved longitudinally with respect to the tank into various adjusted positions. The end wall 12 provides a weir 12a which limits the height to which the water in the tank can rise. Just beyond the weir is a trough 29 for carrying off the water spilling over the weir. This water carries with it a deal of froth, feathers, and debris brought in by the fowls which are being scalded. The water beneath the apron 27 is in a quiescent state so that this lighter material can readily rise to the surface while heavy material sinks to the bottom. A quick opening valve 30 of any well known type which preferably extends the width of the tank is provided at the lower right-hand end. This is opened for the purpose of cleaning the tank of this heavy material, and at the same time the apron 27 may also be removed.

The space 27a between the last baffle 26 and the apron 27 serves as a downtake for the propeller and this, together with the direction taken by the water entering this space, due to the baffle 26, causes a pronounced swirl to occur at this point. A fowl in passing through will be caught by it and turned so as to cause many of its feathers to stand out away from the body of the fowl, thereby permitting hot water to get to the skin beneath. The space 27a may be varied by moving the apron 27, thereby increasing or decreasing the length of time the fowl is immersed.

The tank is filled with water as by means of a pipe 31 connected to a suitable source of water supply which is controlled by means of a valve 32. This water is preferably inserted behind the baffle 26. While the valve 32 is used for rapidly filling the tank, this pipe is also provided with a small pet-cock or the like 33 which can be opened a small amount so as to provide a gradual feed of water which will make good the losses, due to the water splashed or carried out by fowls being scalded, and will also provide a small overflow over the weir 12a. The water in the tank is heated by steam supplied through a steam pipe 34 which has a series of holes 35 adjacent the grating 22. The supply of steam for this purpose is preferably regulated by means of a thermostat 36 which may be located behind one of the baffles in the side of the tank.

I claim:

1. In mechanism for scalding fowls, a traveling conveyor from which the fowls are suspended, a tank beneath the conveyor adapted to hold hot water, and means for propelling the water through the upper portion of the tank in the same general direction as the fowls are moving, the height of the water at the entering end of the tank being higher than the level in the tank so that the falling water submerges the fowls as they enter the tank.

2. In mechanism for scalding fowls, a traveling conveyor from which the fowls are suspended, a tank beneath the conveyor adapted to hold hot water, and means for propelling the water through the upper portion of the tank in the same general direction as the fowls are moving, the upper portion of the tank being tortuous so as to produce eddy currents which ruffle the feathers of the fowls, thereby thoroughly wetting the feathers and the skins of the fowls.

3. In mechanism for scalding fowls, a traveling conveyor from which the fowls are suspended, a tank beneath the conveyor adapted to hold hot water, means for propelling the water through the upper portion of the tank in the same general direction as the fowls are moving, and means for producing surges of the water from side to side as they travel through the tank, thereby thoroughly wetting the feathers and the skins of the fowls.

4. In mechanism for scalding fowls, a traveling conveyor from which the fowls are suspended, a tank beneath the conveyor adapted to hold hot water, means for propelling the water through the upper portion of the tank in the same general direction as the fowls are moving, and baffles on the sides of the tank for producing surges of the water from side to side as they travel through the tank, thereby thoroughly wetting the feathers and the skins of the fowls.

5. In mechanism for scalding fowls, a traveling conveyor from which the fowls are suspended, a tank beneath the conveyor adapted to hold hot water, means for propelling the water through the upper portion of the tank in the same general direction as the fowls are moving, and means for forming a swirl in the water for rotating the fowls while held suspended in the water so as to insure penetration of the water to the skins of the fowls.

6. The method of scalding fowls comprising suspending and transporting the fowls through a body of hot water, the water flowing in the direction taken by the fowls, directing the water flow downwardly at the point where the fowls enter the water so as to assist in immersing the fowls, and swirling the body of water so as to raise the feathers of the fowls to insure wetting the skins of the fowls.

7. The method of scalding fowls comprising suspending and transporting the fowls through a body of hot water, the water flowing in the direction taken by the fowls, directing the water flow downwardly at the point where the fowls enter the water so as to assist in immersing the fowls, and swirling the body of water rapidly so as to rotate the fowls about a nearly vertical axis, whereby the feathers of the fowls will be raised to insure wetting of the skins of the fowls.

8. In mechanism for scalding fowls, a traveling conveyor from which the fowls are suspended, a tank beneath the conveyor adapted to hold hot water, means for propelling the water through the upper portion of the tank in the same general direction as the fowls are moving, staggered baffles located in the sides of the tank to produce swirls, means for heating the water in the tank, and a thermostat located behind one of the baffles and adapted to control the heating means.

BOHUMIL BOUDA.